United States Patent [19]

Brewer

[11] Patent Number: 4,958,794
[45] Date of Patent: Sep. 25, 1990

[54] DUAL PURPOSE ALIGNMENT BRACKET FOR USE WITH LASER OR OPTICAL SCOPE

[75] Inventor: Richard A. Brewer, Buckley, Wash.

[73] Assignee: The Boeing Company, Seattle, Wash.

[21] Appl. No.: 305,242

[22] Filed: Feb. 1, 1989

[51] Int. Cl.$^5$ .............................................. G02B 7/00
[52] U.S. Cl. ..................................... 248/183; 248/913; 33/1 M
[58] Field of Search ............... 248/183, 178, 287, 913, 248/70, 274, 276, 316.4; 33/256, 257, 1 M; 350/531; 74/424.8 R

[56] References Cited

U.S. PATENT DOCUMENTS

| | | | |
|---|---|---|---|
| 2,869,418 | 1/1959 | Miller . | |
| 3,318,593 | 5/1967 | Guernet | 350/531 |
| 3,436,050 | 4/1969 | Tibbals, Jr. | 248/183 |
| 3,596,863 | 8/1971 | Kaspareck | 248/183 |
| 3,652,146 | 3/1972 | George | 350/531 |
| 3,849,857 | 11/1974 | Murray, Jr. | 248/913 |
| 3,917,385 | 11/1975 | Caswell | 248/485 |
| 4,077,722 | 3/1978 | Bicskei | 248/913 |
| 4,491,294 | 1/1985 | Blume | 248/274 |
| 4,635,887 | 1/1987 | Hall | 33/1 M |
| 4,772,109 | 9/1988 | Cutburth | 350/531 |

FOREIGN PATENT DOCUMENTS

| | | | |
|---|---|---|---|
| 110814 | 10/1928 | Austria | 350/531 |
| 1201724 | 9/1965 | Fed. Rep. of Germany . | |
| 44601 | 2/1987 | Japan | 33/1 M |

*Primary Examiner*—Alvin C. Chin-Shue
*Assistant Examiner*—Robert A. Olson
*Attorney, Agent, or Firm*—Conrad O. Gardner; B. A. Donahue

[57] ABSTRACT

An alignment bracket assembly utilized to support a laser or scope alignment system during routine inspection of large assembly tools such as aircraft wing tools. The instrument such as laser or optical scope is secured by means of a bungee cord so as to bear against a pair of coarse adjustment screw means. A pair of sine bar means are utilized in pivot relationship and cooperating with wedge elements translatable by way of a pair of fine adjustment screw means.

1 Claim, 2 Drawing Sheets

DUAL PURPOSE ALIGNMENT BRACKET FOR USE WITH LASER OR OPTICAL SCOPE

FIELD OF THE INVENTION

This invention relates to the method and apparatus for scope and laser alignment, and in particular, to alignment of laser or scope to target zero point at long distances greater than about 50 feet.

DESCRIPTION OF PRIOR ART

Patent literature includes U.S. Pat. No. 3,917,385 to Caswell which is related to the positioning or aligning of electro-optical devices and involves micropositioning but includes a ring within a ring in contrast to the present alignment bracket assembly.

The present preferred embodiment of the invention replaces previous methods of scope and laser alignment. It is a solution to the problem of bucking in (alignment of laser or scope to target zero point) a laser or scope at long distances quickly and efficiently. The present alignment bracket assembly is advantageous in holding the buck in for a much greater length of time, and is further adaptable to those applications where the scope or laser is to be used in very close tolerance work, e.g. for mounting to angles on end gates or other stationary devices; utilization on candlestick mounts; or utilization on large FAJ's (floor mounted assembly jigs).

Existing methods of alignment of lasers or scopes include the cone mount and standard candlestick mount, neither of which are efficient or suitable for aligning a laser at distances greater than 50 feet, both methods also being difficult and time consuming for utilization at shorter distances. These existing methods can be contrasted with the present alignment bracket assembly which is extremely fast and accurate at longer distances such as aircraft wing tools which exceed 100 feet in length.

SUMMARY OF THE INVENTION

The invention relates to an alignment bracket assembly for lasers or scopes adapted to align lasers and scopes to a target zero point quickly and efficiently.

The present alignment bracket assembly and method permit rough bucking of a laser mounted in the alignment bracket assembly with a pair of course adjustment screws to hit the buck in target. After the target is found with the laser, a pair of fine adjustment screws are then used to accurately adjust the laser on target quickly and efficiently.

DESCRIPTION OF THE PREFERRED EMBODIMENT

Figure 1:
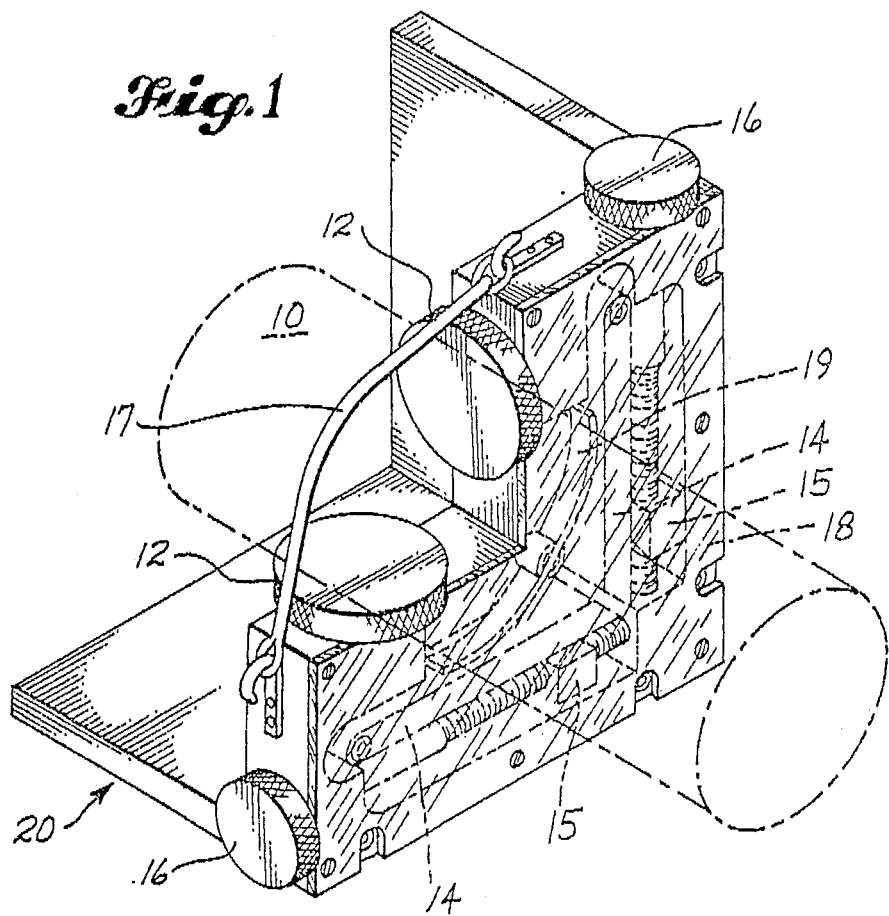
FIG. 1 is a perspective view of a preferred embodiment of the invention.

In the following description, the same reference numeral(s) are used in conjunction with corresponding components in each of the drawing figures.

Figure 2:
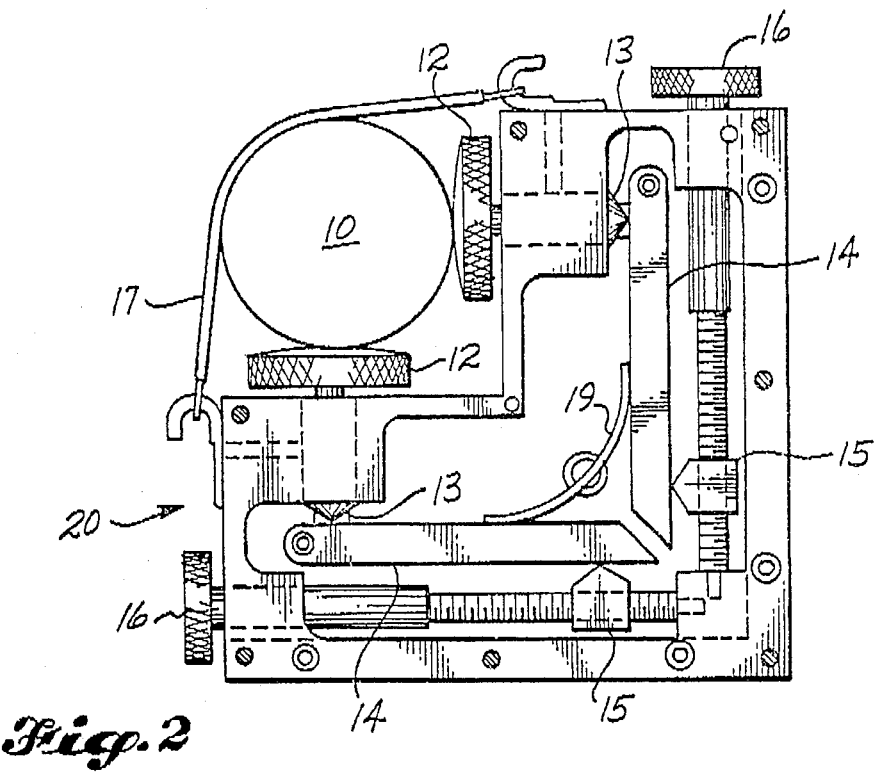
FIG. 2 is a side elevational view of the preferred embodiment shown in FIG. 1; and, FIG. 3 is a top plan view of the preferred embodiment of FIGS. 1 and 2.
Figure 3:
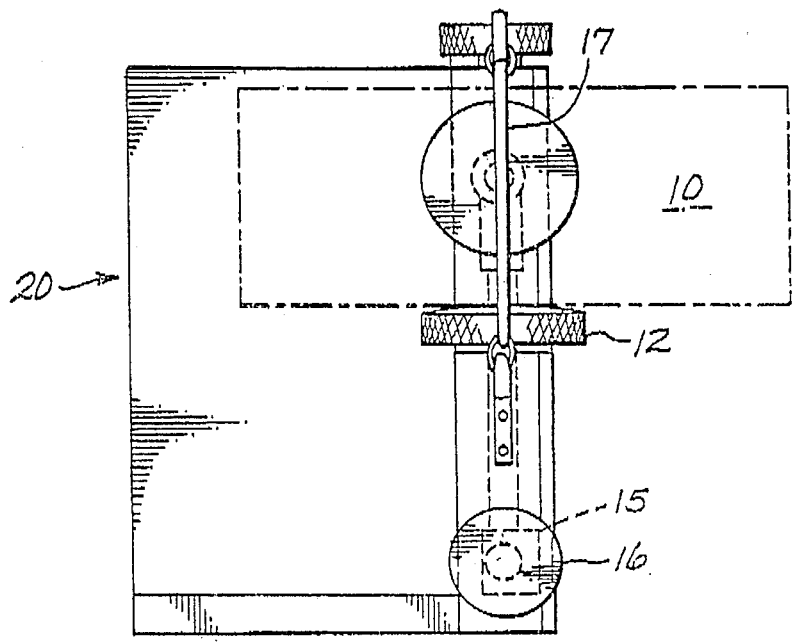

Referring now to FIG. 1, there is shown a perspective view of the present dual purpose bracket assembly 20. The laser or scope 10 rests on a pair of coarse adjustment screws 12 and is held by securing means comprising bungee cord 17 (see also FIG. 3). The pair of coarse adjustment screws 12 are threaded into coarse adjustment sockets 13 which abuts against the top of a pair of sine bars 14 as shown more clearly with reference to the side elevational view of FIG. 2. Sine bars 14 are pivoted with sine wedges 15 which rest against the bottom of sine bars 14. Sine bars 14 are moved back and forth by means of a respective pair of fine adjustment screws 16.

When laser 10 is mounted in dual purpose alignment bracket assembly 20, laser 10 is rough bucked in with coarse adjustment screws 12 to hit the buck in the target (not shown). After the target is found with laser 10, then the pair of fine adjustment screws 16 are used to accurately adjust laser 10 on target quickly and efficiently.

What is claimed is:

1. An alignment bracket assembly (20) for use with an instrument (10), said alignment bracket assembly (20) comprising in combination:

means (17) for securing said instrument (10) against a pair of coarse adjustment screws (12);

a pair of sine bars (14);

a pair of coarse adjustment sockets (13);

said pair of coarse adjustment sockets (13) disposed against said pair of sine bars (14);

said pair of coarse adjustment screws (12) threaded into said pair of coarse adjustment sockets (13);

a pair of wedge elements (15);

a pair of fine adjustment screws (16); and, said pair of sine bars (14) pivotally disposed and cooperative with said wedge elements (15) translatable by means of said fine adjustment screws (16) through coarse adjustment screws (12).

* * * * *